(12) United States Patent
Mauthner

(10) Patent No.: US 6,336,260 B1
(45) Date of Patent: Jan. 8, 2002

(54) GATED RIGGING PLATE

(75) Inventor: Kirk Martin Mauthner, Invermere (CA)

(73) Assignee: Basecamp Innovations, Ltd., Invermere (CA)

( * ) Notice: Subject to any disclaimer, the term of this patent is extended or adjusted under 35 U.S.C. 154(b) by 0 days.

(21) Appl. No.: 09/610,945

(22) Filed: Jul. 6, 2000

(51) Int. Cl.$^7$ ................................................. F16B 45/02
(52) U.S. Cl. ....................... 24/376; 24/582.11; 24/599.6
(58) Field of Search .................. 24/370, 371, 373–376, 24/582.1, 582.11, 582.12, 582.13, 582.14, 588.1, 588.11, 599.1, 599.4–600.3, 697.2; 114/108, 114; 294/82.1, 82.19, 82.2, 82.21, 82.32

(56) References Cited

U.S. PATENT DOCUMENTS

| 67,489 | A | * | 8/1867 | Bottomley |
| 760,171 | A | * | 5/1904 | Atwell |
| 2,552,758 | A | * | 5/1951 | Andersen |
| 2,556,741 | A | * | 6/1951 | Reyburn |
| 2,559,999 | A | * | 7/1951 | Regan et al. |
| 2,872,717 | A | * | 2/1959 | Kelley |
| 3,194,598 | A | * | 7/1965 | Goldfuss |
| 4,007,808 | A | * | 2/1977 | Conley et al. |
| 5,940,943 | A |   | 8/1999 | Kloster |

OTHER PUBLICATIONS

PMI—PETZL Distribution Equipment Catalog, 1996, p. 15, PMI–PETZL Distribution, Inc., Lafayette, GA, USA Copyright 1996 PMI–PETZL Distribution, Inc. Printed in Switzerland.
PMI—PETZL Work and Rescue Catalog, 1997, p. 8, PMI–PETZL Distribution, Inc., Lafayette, GA, USA.
PMI—PETZL Work and Rescue Catalog, 1998, p. 27, PMI–PETZL Distribution, Inc., Lafayette, GA, USA.
PETZL Work and Rescue Catalog, 1998, p. 35, PMI–PETZL Distribution, Inc., Lafayette, GA, USA, Copyright PETZL 1998, Printed in Switzerland.

* cited by examiner

Primary Examiner—James R. Brittain
(74) Attorney, Agent, or Firm—Anthony C. Edwards

(57) ABSTRACT

The gated rigging plate of the present invention includes a rigid member having first and second opposite ends, first and second rigid arms mounted to the member, and extending away from the first end of the member from opposite sides of the member adjacent the second end of the member. The first end of the rigid member has at least one anchor aperture formed therein. The first and second rigid arms have corresponding first and second distal ends. The first and second distal ends are inwardly turned in opposed facing relation so as to define corresponding opposed facing first and second rigging component receiving cavities between the first and second rigid arms and the second end of the member. The rigid plate may be pivotally mounted to the rigid arms.

15 Claims, 4 Drawing Sheets

GATED RIGGING PLATE

FIELD OF THE INVENTION

This invention relates to rigging plates used for anchoring multiple rigging components and in particular to a rigging plate which combines the advantages of a gated carabiner and a conventional rigging plate wherein the gates are in an inwardly opposed facing orientation so as to protect the gates from impact to thereby avoid their inadvertent opening.

BACKGROUND OF THE INVENTION

It is often desirable to releasably mount multiple rigging components such as pulley systems or descent devices to a single rigging plate which is itself anchored for use in climbing, in rescue operations, rope access work, or in any other application wherein multiple sets of rigging may be more efficiently anchored by the use of a single rigging plate. Rigging plates per se are known in the prior art, for example such as those manufactured by Petzl of Crolles, France, and Salt Lake City, Utah, U.S.A. Such rigging plates are exemplified by the Petzl Rigger™, model P61, and Paw™, model P63 rigging plates. These rigging plates are rigid structures, which may be elongate, having a single or multiple anchoring apertures along one edge of the plate and a spaced apart array of rigging component apertures along an opposite edge of the plate. Typically an anchoring device is attached to at least one of the anchoring apertures. Rigging components may then be attached to one or more of the rigging component apertures, for example a descent device may be attached one of the rigging component apertures and a pulley system or multiple pulleys to provide a multiple sheaved pulley system may be mounted to the other rigging component apertures. In some instances, for example, in rescue operations, a main line and a belay line may be mounted to the rigging component apertures, so long as the anchor apertures are anchored by multiple anchors so as to not compromise the use of a belay line as a backup line to the main line.

In the use of conventional rigging plates, a carabiner is mounted through an anchor aperture. This allows the rigging plate to pivot or rock back and forth as different loads are applied to the different rigging devices in the spaced apart rigging device apertures while maintaining tension on the anchor carabiner safely along its major axis.

Typically, conventional carabiners such as the Petzl William Lock™, model M24, William Spinball™, model M25, or William Ball Lock™, model M26, carabiners may be employed to releasably mount rigging components to the rigging component apertures on the rigging plate.

Other carabiner designs are known in the prior art, such as the double carabiner of Kloster which is the subject of U.S. Pat. No. 5,940,943 which issued Aug. 24, 1999. Kloster discloses a carabiner which, instead of having a single asymmetrically mounted gate as in conventional single carabiners, has a pair of symmetrically mounted oppositely disposed gates, oppositely disposed on either side of a central shank. What is neither taught nor suggested by Kloster, and which it is an object of the present invention to provide, is a combination rigging plate and multiple carabiner which functions as both a rigging plate and carabiner. Were the design of Kloster so employed, Kloster's double carabiner frame would twist so as to align the tension in the anchoring line with the tension in the rigging component line, thereby bringing the two lines dangerously close to contacting the gates. This is dangerous in that the gates of carabiners are not designed to withstand the loading. Rather, the loading is meant to be taken up by the shank and opposed facing legs of the carabiner. Thus if the double carabiner of Kloster twisted so that the lines contacted the gates, the safe loading capacity might be compromised.

SUMMARY OF THE INVENTION

In summary, the gated rigging plate of the present invention includes a rigid member having first and second opposite ends, first and second rigid arms mounted to the member, and extending away from the first end of the member from opposite sides of the member adjacent the second end of the member. The first end of the rigid member has at least one anchor aperture formed therein. The first and second rigid arms having corresponding first and second distal ends. The first and second distal ends are inwardly turned in opposed facing relation so as to define corresponding opposed facing first and second rigging component receiving cavities between the first and second rigid arms and the second end of the member.

The first and second rigging component receiving cavities have corresponding opposed facing first and second entryways. Corresponding first and second gates are pivotally mounted to the second end of the member for releasably closing the first and second entryways respectively. A web may extend between the first and second ends of the rigid member and between the first and second rigid arms.

Advantageously, the first and second gates are independently resiliently urged, by resilient biasing means, into closed positions. In their closed positions they releasably close, respectively, the first and second entryways. The first and second gates are each pivotable between open positions and the closed positions. In the open positions the first and second entryways are opened to allow passing rigging components into the first and second rigging component cavities.

In one alternative embodiment, the gated rigging plate may further include an elongate stem rigidly mounted to the second end of the rigid member so as to extend along, generally co-axially with, an axis of symmetry of the rigid member. The stem thus extends between the first and second rigid arms. The elongate stem may have a T-shaped distal end defining oppositely disposed third and fourth rigging component receiving cavities. The third and fourth rigging component receiving cavities have corresponding third and fourth entryways closed by corresponding third and fourth pivotally mounted gates. The third and fourth pivotally mounted gates may be pivotally mounted to the second end of the rigid member.

Further advantageously, the first and second distal ends are notched for mating latching therein of corresponding free ends of the first and second gates.

In one aspect of the invention, the rigid member, the first and second arms, the first and second entryways, and the first and second rigging component receiving cavities are symmetrically disposed about the axis of symmetry of the rigid member.

In a further aspect, the first and second rigging component receiving cavities are elongate along corresponding major axes. The major axes coincide with tension force vectors between an anchor mounted to one of the anchor apertures and a rigging component mounted to the rigging component receiving cavity. The first and second gates may be substantially parallel to the corresponding major axes when closed across the first and second entryways. The minor axes of the first and second rigging component receiving cavities may be perpendicular to the corresponding major axes and extend through the first and second entryways.

In a further alternative embodiment, the first and second rigging component receiving cavities and corresponding the first and second gates are part of an array of rigging component receiving cavities and corresponding gates enclosed between the first and second arms. The first and second arms, in all embodiments of the present invention, provide protective shielding of the gates from side-on impact. Thus the first and second arms are not necessarily linear or curved substantially as illustrated and referred to below, but may without intending to be limiting, be of any appropriate protective shape.

In a still further alternative embodiment, the first and second arms may be pivotally mounted to the rigging plate by pivoting means.

Figure 1:
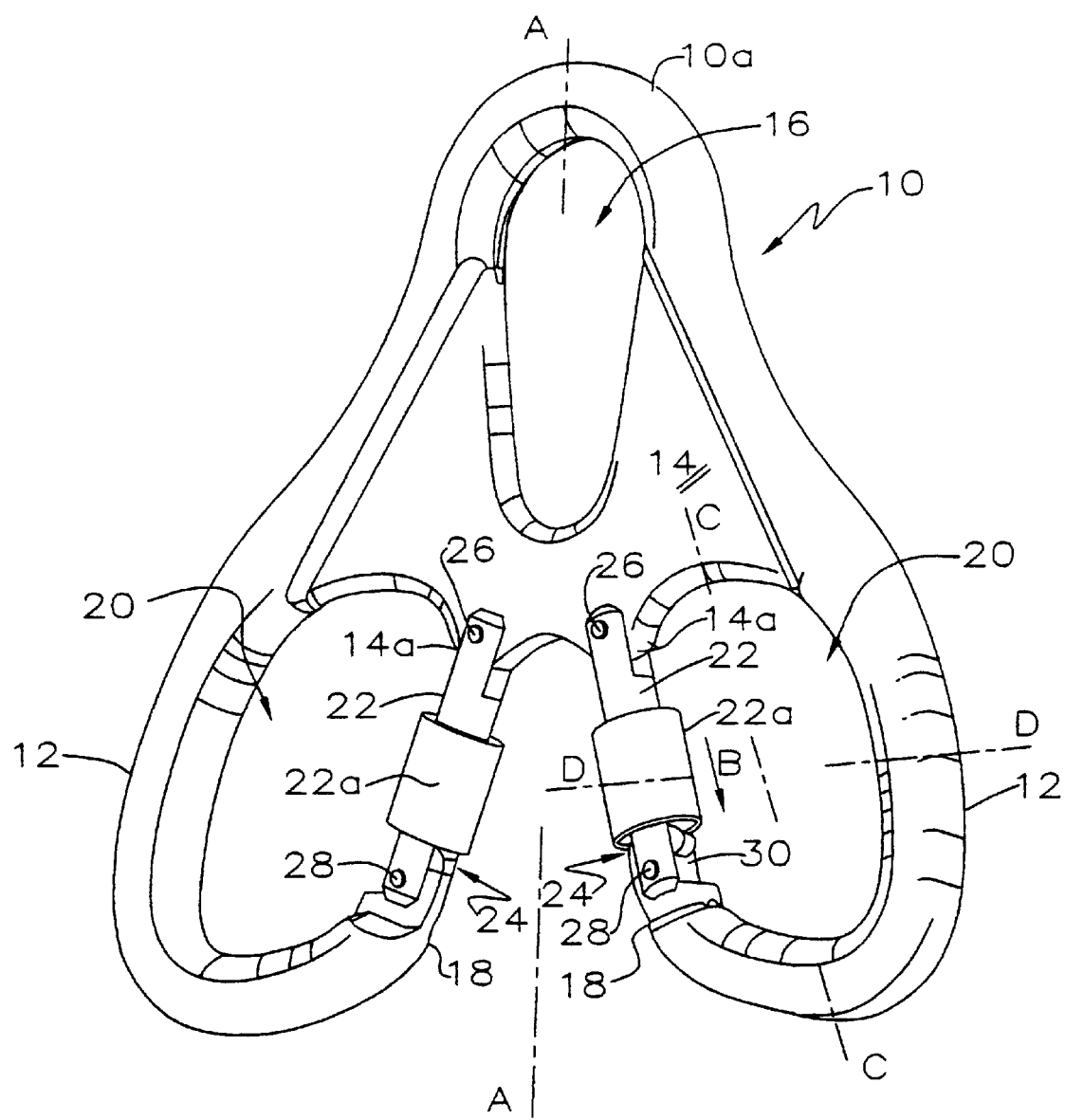
FIG. 1 is, perspective view, the gated rigging plate of the present invention.

FIG, 1a is, in perspective view, the gated rigging plate of FIG. 1 with one gate removed.

Figure 2:
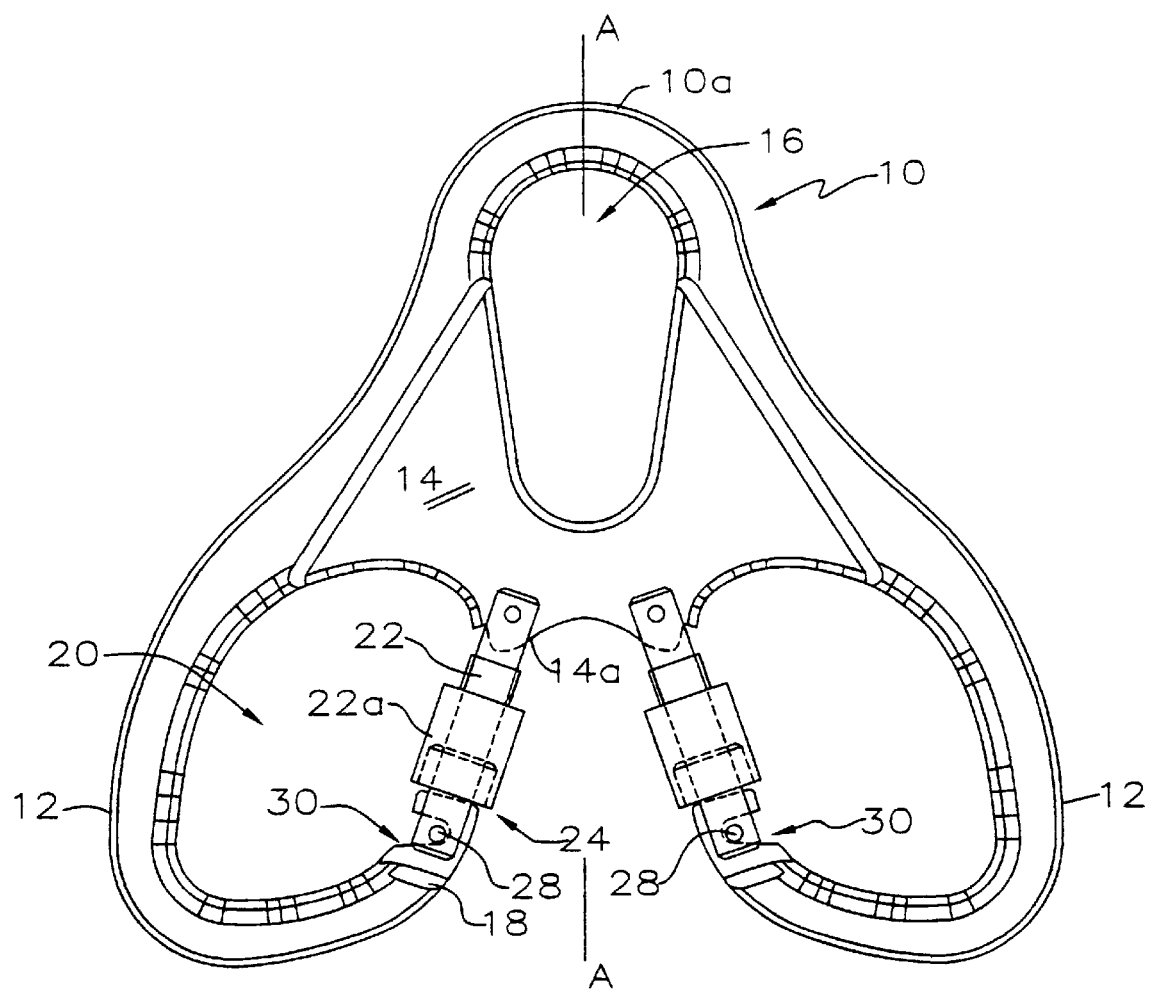

FIG. 2 is, in plan view, the gated rigging plate of FIG. 1.

Figure 3:
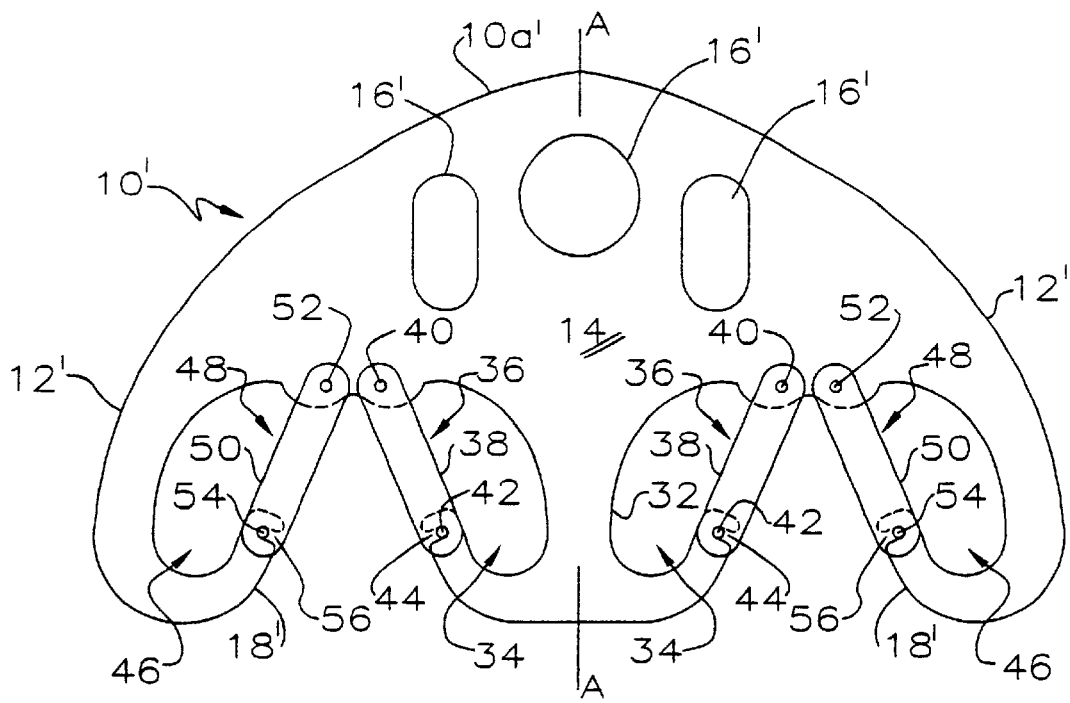

FIG. 3 is an alternative embodiment of the gated rigging plate of the present invention in plan view.

Figure 4:
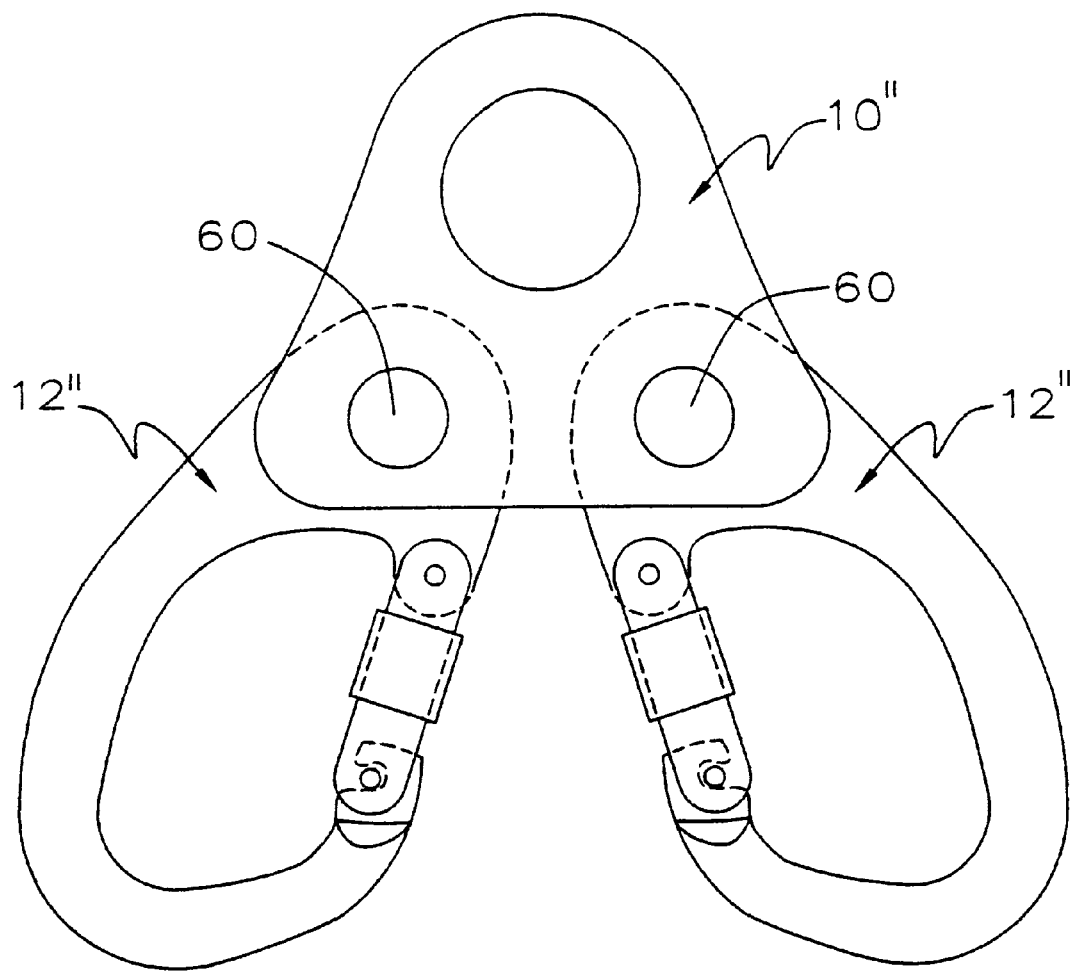

FIG. 4 is a further alternative embodiment of the gated rigging plate in plan view with the carabiners pivotally mounted to the rigging plate.

DETAILED DESCRIPTION OF PREFERRED EMBODIMENTS

A rigging plate is commonly used in rope rescue, in climbing, in rope access work, and in other rope applications when it is desirable to attach multiple rigging components to an anchor system. A rigging plate keeps the rigging cleaner and more organized. Current rigging plate designs are simply metal plates of various geometric shapes with multiple holes drilled through them. Carabiners or snap links are used to mount rigging components to the holes in the rigging plates. The gated rigging plate of the present invention eliminates the need for separate carabiners for mounting rigging components to the rigging plates. The gates of the rigging plate are preferably inwardly facing and may be in opposed facing relation so as to protect the gates from inadvertent release or opening in the event that the rigging plate is inadvertently bumped or impacted from either side, for example as the rigging plate pivots about its anchor as the loading on the rigging components changes.

Figure 1A:
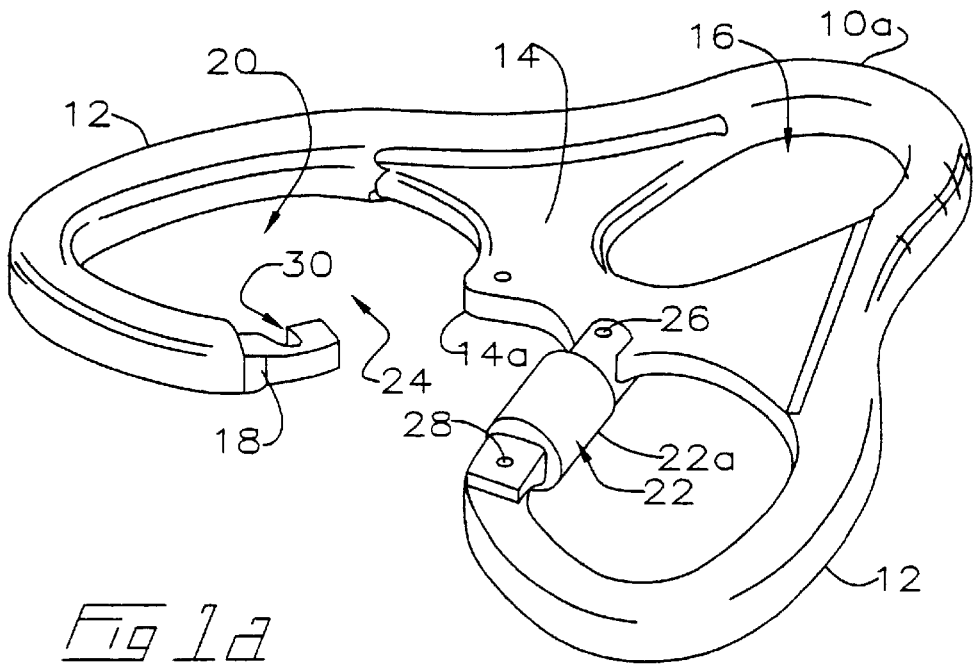

Thus as seen in FIGS. 1, 1a and 2, gated rigging plate 10 is a rigid load bearing structure having an anchor end 10a rigidly mounted to oppositely disposed arms 12. Web 14 extends between anchor end 10a and arms 12. An anchor aperture 16 is formed in web 14 adjacent anchor end 10a. The use of a single anchor aperture 16 is not intended to be limiting in that plurality of anchor apertures may be provided such as seen in the alternative embodiment of FIG. 3.

The distal ends 18 of arms 12 are turned inwardly relative to axis of symmetry A so as to be positioned in mirror image on either side of axis A. Arms 12 define rigging component apertures 20. Gates 22 complete the perimeter structure surrounding rigging component apertures 20. Gates 22 close the opposed facing entryways 24 into rigging component apertures 20 through which lines or mounting devices would be snapped for releasable mounting within rigging component apertures 20.

Gates 22 are pivotally mounted to web 14 on pins 26 oppositely disposed on either side of axis A. Pins 26 may be journalled through web protrusions 14a depending from web 14. Gates 22 may be spring biased by known means so as to urge pins 28 into notches 30 to thereby releasably close the gates across entryways 24. Advantageously, conventional threaded sleeves 22a are threadably mounted onto gates 22. Sleeves 22a may be rotated relative to gates 22 on their internal threading so as to translate them in direction B. Sleeves 22a may thus be translated so as to cover pins 28 and notches 30 in distal ends 18.

In the alternative embodiment of FIG. 3, rigging plate 10' is expanded laterally of axis A. Webbing 14 has a plurality of anchoring apertures 16'. A central stem 32 extends from web 14. Stem 32 may be an inverted T-shape so as to define inner rigging component apertures 34. The entryways 36 to inner apertures 34 are closed by gates 38. Gates 38 are pivotally mounted on pins 40 journalled in web 14. Gates 38 are resiliently urged by springs or the like (not shown) about pins 40 so as to seat pins 42 in notches 44 (shown in dotted outline).

Anchor apertures 16' are located adjacent anchor end 10a'. Rigid arms 12' extend outwardly from web 14. The distal ends 18' of arms 12' curve inwardly relative to axis A so as to define outer rigging component apertures 46 having corresponding entryways 48. Entryways 48 are closed by resiliently biased gates 50. Gates 50 are resiliently biased closed by resilient biasing means such as springs as known in the art (not shown), about pivot pins 52 so as to seat pins 54 in notches 56 (shown in dotted outline). Gates 38 and 50 may be, in addition, locked in their closed position by means of threadably mounted sleeves such as the sleeves 22a of FIGS. 1 and 2.

In the alternative embodiment of FIG. 4, rigging plate 10" may be pivotally mounted to arms 12" by pivot pins 60.

In the preferred embodiments, the gated rigging plates of the present invention meet the National Fire Protection Association 1983 (95 edition) "General Use" specifications (5-5.2.1-3). Thus, along the major axes such as major axis C seen in FIG. 1, carabiners and snap link auxiliary equipment must be able to withstand 9000 pounds (40 kN) loading in tension with the gates closed and 2400 pounds (10.67 kN) loading in tension with the gates open. Further, rigging plate 10 must withstand 2400 pounds (10.67 kN) loading in tension across its minor axes such as along axis D. As illustrated, rigging plates 10, 10' and 10" may be made of aluminum alloy such as T6-7075 aluminum alloy. This is not intended to be limiting. Stainless steel alloy, for example 3⅙ inch plate, may be employed, or other suitable materials as would be known in the art and be capable of withstanding the required loading with suitable changes in the relative dimensions of the rigging plate. Further, the use of more than two gates is not intended to be limited to the four gate design of FIG. 3. A multiplicity of gates may be provided, for example by branching the web or arms, or spaced apart along an elongate central stem or inwardly facing along a pair of oppositely disposed arms, or a combination of these so long as the gates are protected from external side-on impact by an outermost pair of rigid members.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A gated rigging plate comprising:

a rigid member having first and second opposite ends, said first end of said rigid member having at least one anchor aperture therein, first and second rigid arms mounted to said member, and extending away from said first end of said member from opposite sides of said member adjacent said second end of said member, said first and second rigid arms having corresponding first and second distal ends, said first and second distal ends inwardly turned in opposed facing relation so as to define corresponding opposed facing first and second rigging component receiving cavities between said first and second rigid arms and said second end of said member, said first and second rigging component receiving cavities having corresponding opposed facing first and second entryways, corresponding first and second gates pivotally mounted to said second end of said member for releasably closing said first and second entryways respectively.

2. The gated rigging plate of claim 1 wherein a web extends between said first and second ends of said rigid member and between said first and second rigid arms.

3. The gated rigging plate of claim 1 wherein said first and second gates are independently resiliently urged, by resilient biasing means, into closed positions releasably closing, respectively, said first and second entryways, wherein said first and second gates are each pivotable between open positions, wherein said first and second entryways respectively are opened to allow passing rigging components into said first and second rigging component cavities respectively, and said closed positions.

4. The gated rigging plate of claim 1 further comprising an elongate stem rigidly mounted to said second end of said rigid member so as to extend along, generally co-axially with, an axis of symmetry of said rigid member between said first and second rigid arms, said elongate stem having T-shaped distal end defining oppositely disposed third and fourth rigging component receiving cavities, said third and fourth rigging component receiving cavities having corresponding third and fourth entryways respectively closed by third and fourth pivotally mounted gates.

5. The gated rigging plate of claim 4 wherein said third and fourth pivotally mounted gates are pivotally mounted to said second end of said rigid member.

6. The gated rigging plate of claim 1 wherein said first and second distal ends are notched for mating latching therein of corresponding free ends of said first and second gates.

7. The gated rigging plate of claim 1 wherein said rigid member and said first and second arms, said first and second entryways, and said first and second rigging component receiving cavities are symmetrically disposed about an axis of symmetry of said rigid member.

8. The gated rigging plate of claim 7 wherein said first and second rigging component receiving cavities are elongate along corresponding major axes coinciding with tension force vectors between an anchor mounted to one of said at least one anchor aperture and a rigging component mounted to said first or second rigging component receiving cavity.

9. The gated rigging plate of claim 8 wherein said first and second gates are substantially parallel to said corresponding major axes when closed across said first and second entryways.

10. The gated rigging plate of claim 9 wherein minor axes of said first and second rigging component receiving cavities are perpendicular to said corresponding major axes and extend through said first and second entryways.

11. The gated rigging plate of claim 10 wherein said second end of said rigid member is a web extending between said first end of said rigid member and said first and second arms.

12. The gated rigging plate of claim 1 wherein said first and second rigging component receiving cavities and corresponding said first and second gates are part of an array of rigging component receiving cavities and corresponding gates enclosed between said first and second arms.

13. The gated rigging plate of claim 1 wherein said first and second rigid arms are pivotally mounted to said second end of said rigid member.

14. The gated rigging plate of claim 13 wherein said first and second rigid arms are carabiners.

15. The gated rigging plate of claim 14 wherein gates on said carabiners are in opposed inwardly facing relation.

* * * * *